United States Patent [19]

Kawabata

[11] Patent Number: 5,148,304
[45] Date of Patent: Sep. 15, 1992

[54] OPTICAL BEAM SCANNING SYSTEM

[75] Inventor: Motonobu Kawabata, Kyoto, Japan

[73] Assignee: Dainippon Screen Mfg. Co., Ltd., Japan

[21] Appl. No.: 660,139

[22] Filed: Feb. 22, 1991

[30] Foreign Application Priority Data

Feb. 28, 1990 [JP] Japan .................................. 2-49916

[51] Int. Cl.⁵ .............................................. G02B 26/10
[52] U.S. Cl. ....................................... 359/207; 250/236
[58] Field of Search ........................ 250/234, 235, 236; 359/205, 206, 207, 216, 217

[56] References Cited

U.S. PATENT DOCUMENTS

| | | | |
|---|---|---|---|
| 4,447,112 | 5/1984 | Matsuoka et al. | 359/207 X |
| 4,571,035 | 2/1986 | Sakuma. | |
| 4,639,072 | 1/1987 | Itoh et al. | 359/205 X |
| 4,712,884 | 12/1987 | Sakuma. | |
| 4,720,632 | 1/1988 | Kaneko | 250/236 X |
| 4,733,064 | 3/1988 | Ishikawa | 250/236 X |
| 4,921,320 | 5/1990 | DeJager et al. | 359/205 |
| 4,950,889 | 8/1990 | Budd et al. | 250/236 |
| 4,963,900 | 10/1990 | Budd et al. | 357/207 X |

FOREIGN PATENT DOCUMENTS

| | | |
|---|---|---|
| 0328915 | 1/1989 | European Pat. Off. . |
| 3207441 | 3/1982 | Fed. Rep. of Germany . |
| 58-179814 | 10/1983 | Japan . |
| 60-133416 | 7/1985 | Japan . |
| 61-120112 | 6/1986 | Japan . |
| 1-210921 | 8/1989 | Japan . |
| 2-040610 | 2/1990 | Japan . |

Primary Examiner—Constantine Hannaher
Assistant Examiner—Edward J. Glick
Attorney, Agent, or Firm—Ostrolenk, Faber, Gerb & Soffen

[57] ABSTRACT

A light beam passing through a first image-forming system is deflected by a deflector. The deflected light impinges upon a second image-forming system which comprises a scanning lens and an anamorphic lens. The scanning lens and the anamorphic lens are disposed in this order from the deflector side. The light beam passing through the anamorphic lens is finally focused on a surface to be scanned with no curvature of field.

7 Claims, 17 Drawing Sheets

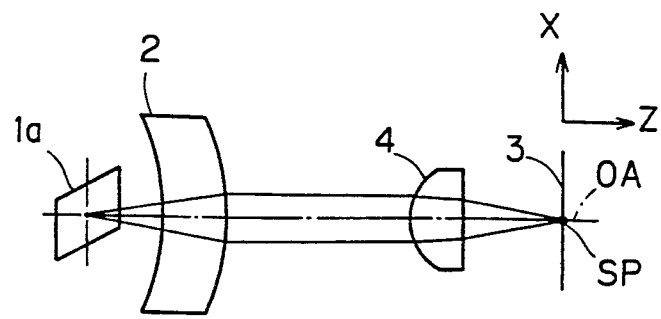
FIG. 2A (BACKGROUND ART)
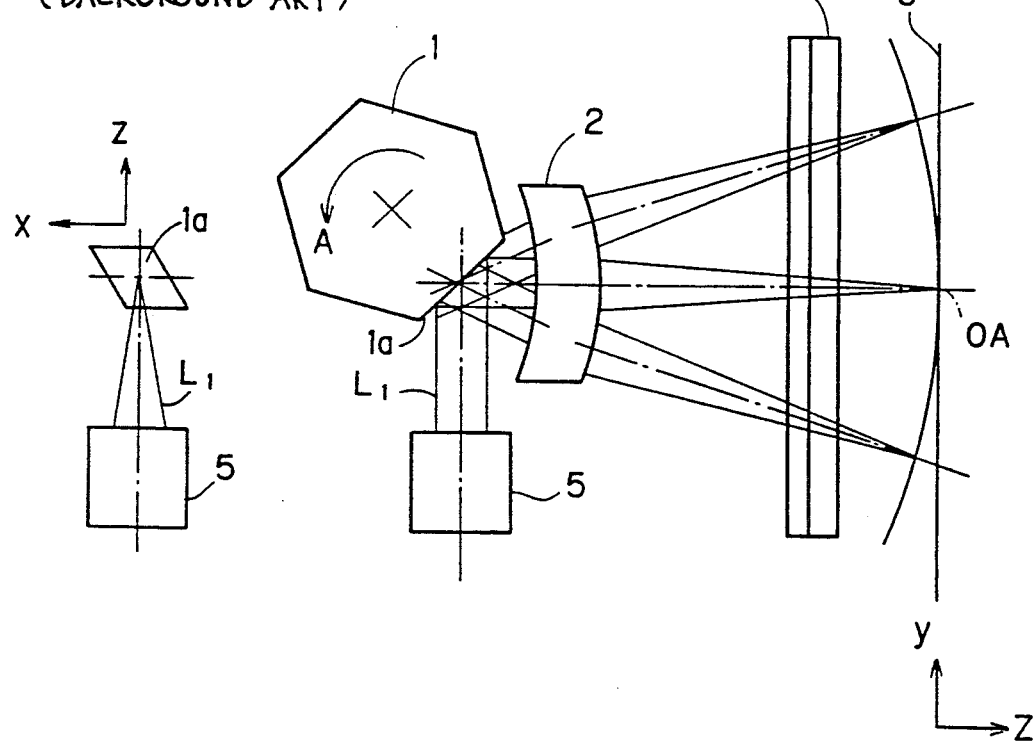
FIG. 2B (BACKGROUND ART)
FIG. 2C (BACKGROUND ART)

FIG. 3A (BACKGROUND ART)
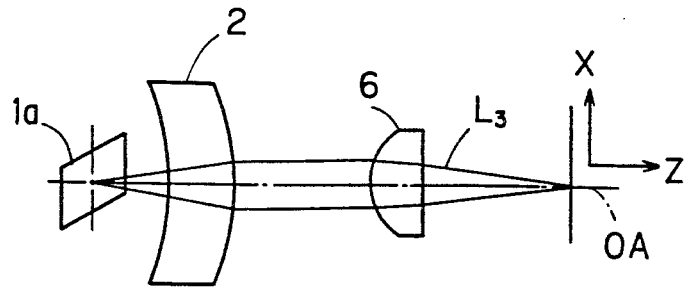
FIG. 3B (BACKGROUND ART)
FIG. 3C (BACKGROUND ART)
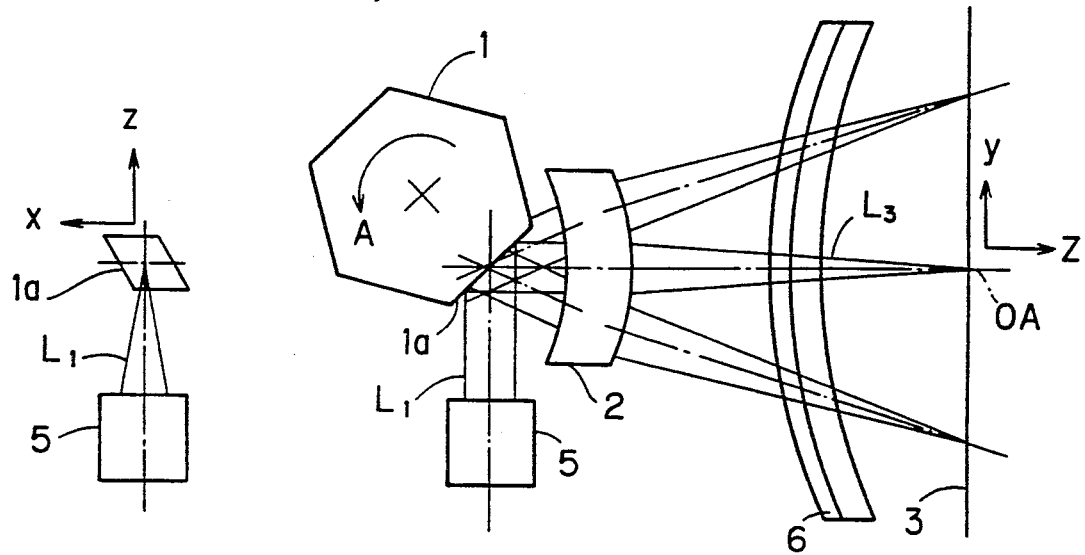

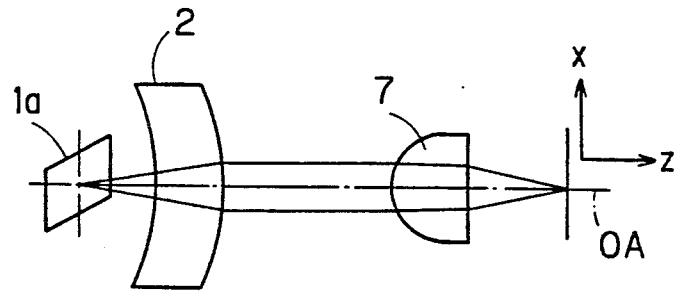
FIG. 4A (BACKGROUND ART)
FIG. 4B (BACKGROUND ART)
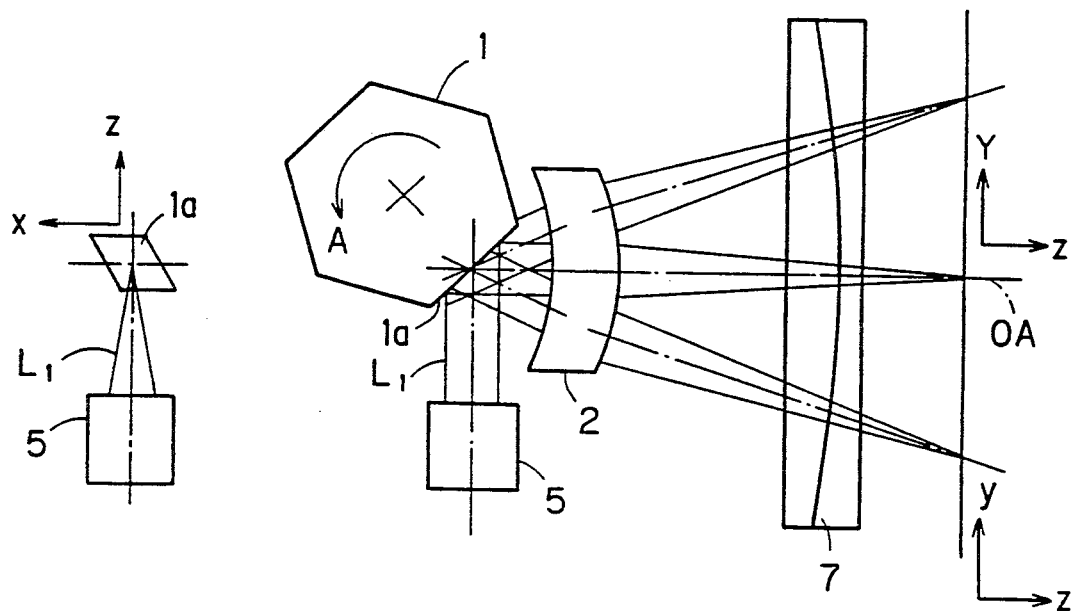
FIG. 4C (BACKGROUND ART)

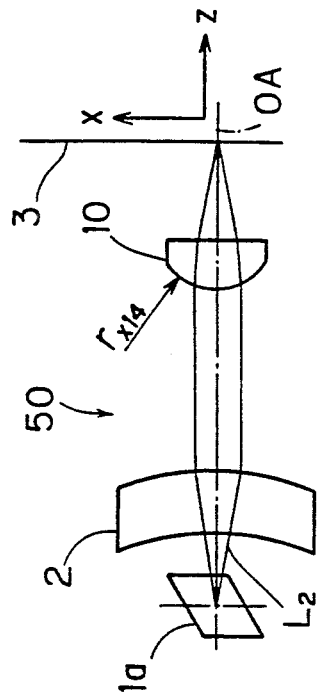
FIG. 5A
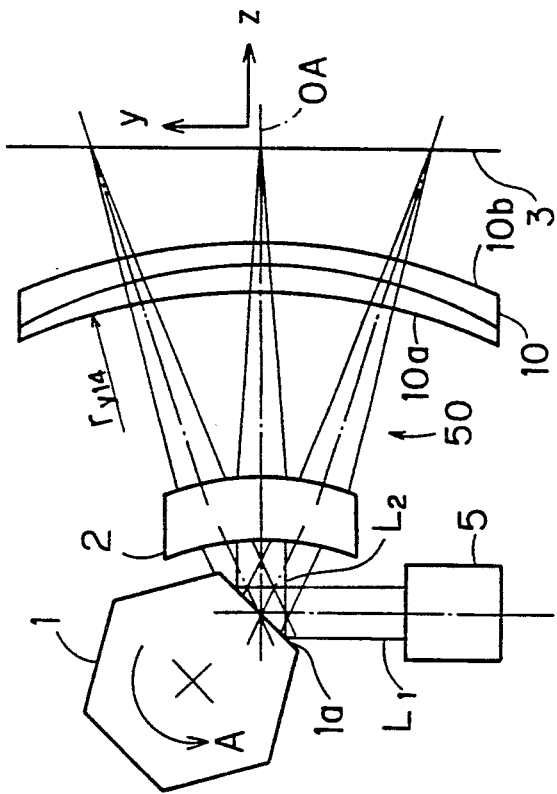
FIG. 5B
FIG. 5C

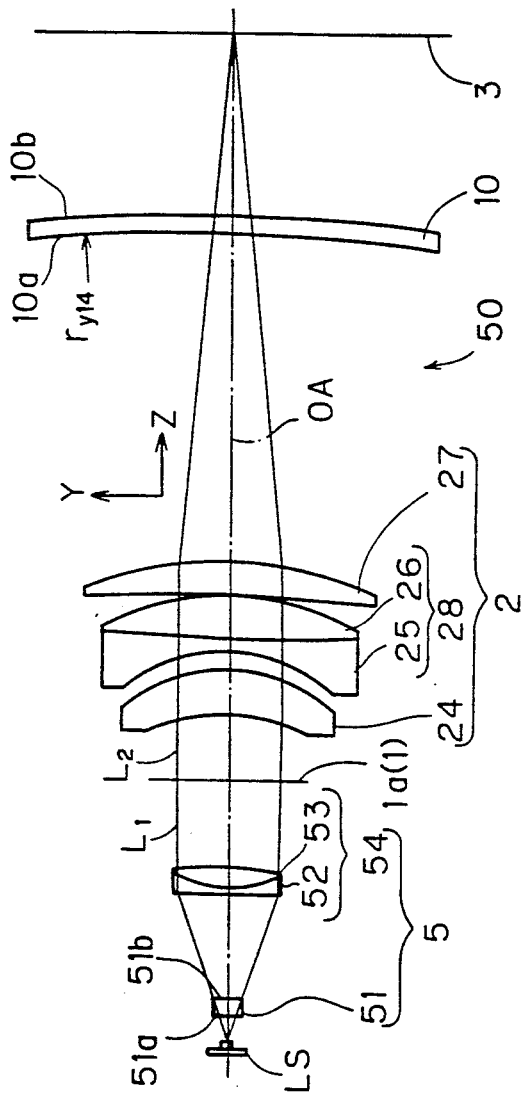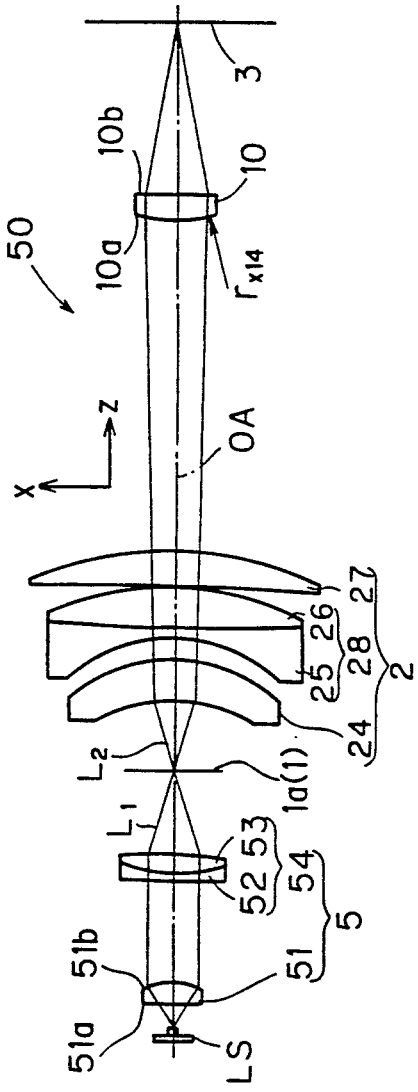
FIG. 6A
FIG. 6B

CHARACTERISTICS (a) θ = 25°

(b) θ = 17.5°

(c) θ = 0°

(a) θ = 25°

(b) θ = 17.5°

(c) θ = 0°

(a) θ = 25°

(b) θ = 17.5°

(c) θ = 0°

(a) θ = 25°

(b) θ = 17.5°

(c) θ = 0°

CHARACTERISTICS (a) θ = 25°

(b) θ = 17.5°

(c) θ = 0°

(a) θ = 25°

(b) θ = 17.5°

(c) θ = 0°

CHARACTERISTICS

OPTICAL BEAM SCANNING SYSTEM

BACKGROUND OF THE INVENTION

1. Field of the Invention

The present invention relates to an optical beam scanning system comprising a rotary polygon mirror for deflecting a light beam from a light source and thereby scanning a surface-to-be-scanned by the deflected light beam.

2. Description of the Prior Art

FIGS. 1A and B are respectively a schematic elevational view and a schematic plan view of a prior art optical beam scanning system. In the optical beam scanning system, a light beam L from a light source (not shown) is deflected by mirror surfaces $1a$ of a rotary polygon mirror 1 which rotates in the direction of the arrow A of FIG. 1B. The deflected light beam $L_2$ is focused on a surface 3 to be scanned through a scanning lens 2. Thus, a beam spot SP which is formed on the surface 3, moves along a scanning direction y at a prescribed speed in accordance with the rotational speed of the rotary polygon mirror 1.

In FIG. 1A is shown a beam spot SP' which is deviated in a direction x substantially perpendicular to the scanning direction y. Assuming an angle of deviation or tilt of $\phi$ from the axis of rotation for the rotary polygon mirror 1, the position of the beam spot SP' in the direction x, i.e. facet error, will be displaced from the desired position SP of FIG. 1A by an amount $\Delta$ proportional to the angular deviation $2\phi$ of the light beam $L_2$. The term "facet error" refers to the deviation of the beam spot of the light beam $L_2$ in the direction x. In such an optical beam scanning system, it is required that the rotary polygon mirror 1 be manufactured such that each mirror surface $1a$ is completely in parallel with the axis of rotation of the mirror. To produce a high-accuracy rotary polygon mirror has a limitation, however, such that the respective mirror surfaces $1a$ of the polygon mirror 1 are not completely parallel but instead, are slightly inclined with respect to the axis of rotation at dispersed angles. Thus, facet error occurs in the optical beam scanning system of FIG. 1 and may causes poor results in terms of the quality of image transfer to the surface 3.

In order to solve this problem, the mirror surfaces $1a$ of the rotary polygon mirror 1 are made optically conjugate with the surface 3 with respect to a direction normal to the scanning plane (equivalent to the yz-plane in FIG. 1). In more concrete terms, this is accomplished by disposing a cylindrical lens 4 having refracting power only along the direction x between the scanning lens 2 and the surface 3, as shown in FIGS. 2A and 2B. Further, as shown in FIGS. 2B and 2C, a first image-forming optical system 5 is disposed between the light source (not shown) and the rotary polygon mirror 1. This forms a light beam $L_1$ which is of parallel rays along the direction y and which is focused on the mirror surfaces $1a$ of the rotary polygon mirror 1 along the direction x. Consequently, the mirror surfaces $1a$ of the rotary polygon mirror 1 are optically conjugate with the surface 3, whereby the facet error is compensated.

Although facet errors are overcome in the optical beam scanning system, including the first image-forming optical system 5, the following problem takes place: Namely, an image field is so curved that an image-forming position deviates from the surface 3 along an optical axis direction z; and the size of the beam spot SP change particularly when the amount of deviation of the beam spot is out of a range of focal depth for the optical beam scanning system.

In order to solve this problem, two techniques have been generally proposed.

(1) One of them is disclosed in Japanese Patent Laid-Open Gazette No. 58-200214 or 58-179813. According to the technique disclosed therein, as shown in FIG. 3 and more particularly FIG. 3B, a cylindrical lens 6 curves so as to approach a surface 3 to be scanned from its optical axis OA toward both end portions thereof, to thereby correct curvature of field.

When the optical beam scanning system includes the cylindrical lens 6 formed as shown in FIG. 3, however, the cylindrical lens 6 must be disposed in the vicinity of the surface 3. The reason for this is that it becomes difficult to correct the curvature of field only by disposing the curved cylindrical lens 6 between the scanning lens 2 and the surface 3 as the overall cylindrical lens 6 is separated from the surface 3. The further the lens 6 is separated from the surface 3, the greater its length is required to be to achieve a large effective scanning width and this results in difficulty in manufacturing. If the cylindrical lens 6 is arranged in the vicinity of the surface 3, further, the beam diameter of a light beam $L_3$ passing through the cylindrical lens 6 is reduced. This results in imaging performance being reduced by dust or the like.

(2) Another technique is that described in Japanese Patent Laid-Open Gazette No. 62-265615, 61-275814 or 60-133416. The references disclose a method or correcting curvature of field by reducing refracting power of a cylindrical lens along a direction (equivalent to the above direction x) normal to a scanning plane (yz-plane) from its optical axis toward both ends thereof. As shown in FIG. 4, for example, a cylindrical lens 7 is so formed that a radius of curvature along a direction x is increased from an optical axis OA toward both ends of the lens 7, to change effective refracting power along the direction x as described above.

Although such lens design is possible in theory, an expression for a configuration of the lens obtained by the design is so complicated that it may be difficult to work a lens in accordance with the expression.

SUMMARY OF THE INVENTION

The present invention is directed to an optical beam scanning system. The optical beam scanning system comprises: a light source for emitting a light beam; a deflector for deflecting the light beam in a first direction; a first optical system for converging the light beam onto the deflector in a second direction, the second direction being perpendicular to the first direction; and a second optical system for focussing the light beam deflected by the deflector on a surface to be scanned, the second optical system comprising a scanning lens and an anamorphic lens, the scanning lens and the anamorphic lens being disposed in this order from the deflector side.

In a preferred embodiment of the present invention, the anamorphic lens has a first surface which is finished according to the following expression:

$$Z = \frac{c_x \cdot X^2 + c_y \cdot Y^2}{1 + \sqrt{1 - c_x^2 \cdot X^2 - c_y^2 \cdot Y^2}}$$

where symbols X, Y and Z represent distances from an original point along the first, the second and a third directions, respectively, the third direction being perpendicular to both the first and the second directions, the original point being of the intersection at which the first surface and an optical axis of the second optical system cross each other, and symbols $c_y$ and $c_x$ represent inverse numbers of radii of curvature of the first surface on the optical axis in the first and the second directions, respectively.

According to an aspect of the invention, signs of the radii of curvature of the first surface in the first and the second direction are different from each other.

According to another aspect of the invention, the anamorphic lens further has a second surface which is finished to a cylindrical surface.

The first and the second surfaces of the anamorphic lens may be constructed in a concentric configuration.

Further, the second surface may be curved in the first direction.

The first surface may be directed to the surface to be scanned.

Alternatively, the first surface may be directed to the deflector.

Accordingly, an object of the present invention is to provide an optical beam scanning system in which a light beam can be focused on a surface to be scanned without substantial curvature of field.

Another object of the present invention is to provide an optical beam scanning system which can correct facet errors.

Further another object of the present invention is to reduce the size of an optical beam scanning system.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1A, 1B, 2A, 2B, 2C, 3A, 3B, 3C, 4A, 4B and 4C illustrate conventional optical beam scanning systems;

FIGS. 5A, 5B and 5C are schematic views of an optical beam scanning system according to a first preferred embodiment of the present invention;

FIG. 6A is a schematic plan view of the optical beam scanning system of FIG. 5;

FIG. 6B is a schematic elevational view thereof;

DESCRIPTION OF THE PREFERRED EMBODIMENTS

Figure 1A:
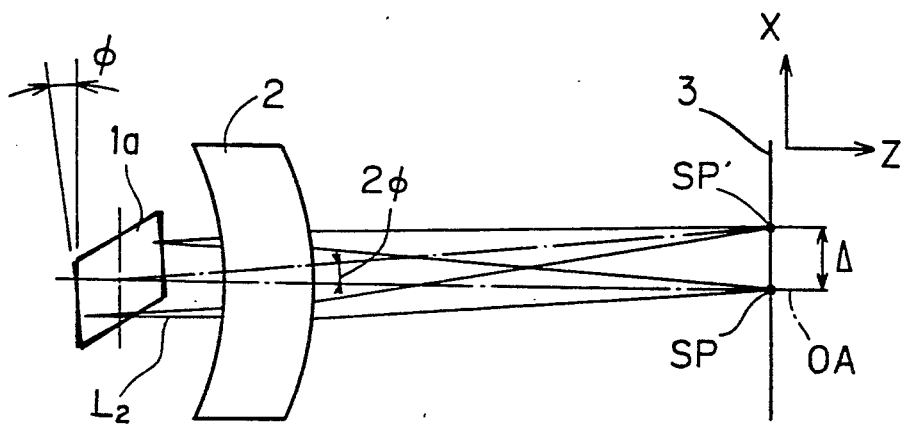
Figure 1B:
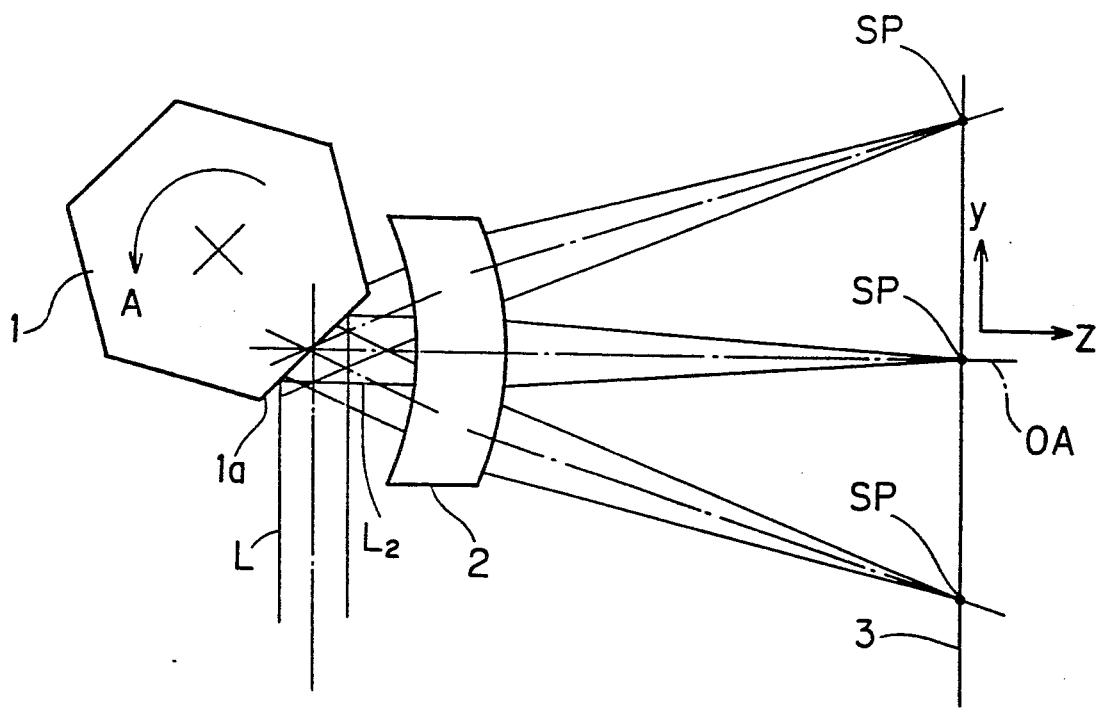

FIG. 5 illustrates an optical beam scanning system according to a first preferred embodiment of the present invention. In the optical beam scanning system, light from a light source (not shown) passes through a first image-forming optical system 5 to form light beam $L_1$ which impinges upon a rotary polygon mirror 1, which rotates in the direction of the arrow A.

The light beam $L_1$ has parallel rays in a direction y and is focused on one of mirror surfaces 1a of the rotary polygon mirror 1 in a direction x.

Between the rotary polygon mirror 1 and a surface 3, a second image-forming optical system 50 is provided. The second image-forming optical system 50 comprises a scanning lens 2 and an anamorphic lens 10, which are disposed on an optical axis in this order from the rotary polygon mirror 1 side. Thus, a light beam $L_2$ deflected by the rotary polygon mirror 1 is imaged to the surface 3 through the second image-forming optical system 50 (the scanning lens 2 and the anamorphic lens 10).

FIG. 6A is a schematic plan view of the optical beam scanning system, and FIG. 6B is a schematic elevational view thereof. For convenience of the following description, a radius of curvature of a lens surface (or a mirror surface) on an optical axis OA in a direction y is defined as $r_y$ and that in a direction x is defined as $r_x$. Further, the radii $r_x$ and $r_y$ of curvature of the i-th (i=1 to 15) lens surface (or mirror surface) from a light source LS (FIGS. 6A and 6B) are defined as $r_{xi}$ and $r_{yi}$, respectively.

As shown in FIGS. 6A and 6B, the first image-forming optical system 5 comprises first to third lenses 51 to 53. These lenses 51 to 53 are disposed in this order from the light source LS side to the rotary polygon mirror 1 side in the first image-forming optical system 5. The first lens 51 is a cylindrical lens which has refracting power only along the direction x. That is, both the radii $r_{y1}$ and $r_{y2}$ have an infinite value while the respective radii $r_{x1}$ and $r_{x2}$ have a prescribed value, the radii $r_{y1}$ and $r_{x1}$ being of curvatures of a surface 51a directed to the light source side in the directions y and x, respectively, the radii $r_{y2}$ and $r_{x2}$ being of curvatures of a surface 51b directed to the rotary polygon mirror 1 in the directions y and x, respectively. Nevertheless, the surface 51b is finished to an aspheric surface, so that its radius of curvature continuously changes from the optical axis OA toward the direction x.

The second and third lenses 52 and 53 are joined to each other, to thereby form a lens group 54. Thus, the light beam $L_1$ passing therethrough is formed as follows: the rays thereof in the direction y are directed to the mirror surfaces 1a in parallel to the yz-plane while the rays thereof in the direction x are converged on the mirror surfaces 1a. The light beam $L_1$ impinges upon the mirror surfaces 1a of the rotary polygon mirror 1.

The light beam $L_1$ is deflected by the mirror surfaces 1a, so that the deflected light beam $L_2$ impinges upon the scanning lens 2. The scanning lens 2 includes fourth to seventh lenses 24, 25, 26 and 27, which are arranged in this order from the mirror surface 1a side to the surface 3 side, as shown in FIGS. 6A and 6B.

Both the fourth and the seventh lenses 24 and 27 are convex meniscus lenses each of which has a concave surface directed toward the mirror surface 1a side. The fifth lens 25 is a biconcave lens, and the sixth lens 26 is a biconvex lens. The fifth and sixth lenses 25 and 26 are joined to each other, to thereby form a lens group 28.

The anamorphic lens 10 has a surface 10a, directed to the scanning lens 2, which is finished according to the following expression:

$$Z = \frac{c_x \cdot X^2 + c_y \cdot Y^2}{1 + \sqrt{1 - c_x^2 \cdot X^2 - c_y^2 \cdot Y^2}} \quad (1)$$

where symbols X, Y and Z represent distances from an original point along the directions x, y and z, the original point being of the intersection at which the surface 10a and the optical axis OA cross each other, and $c_y$... inverse number of a radius $r_{y14}$ of curvature of the surface 10a, $c_x$... inverse number of a radius $r_{x14}$ of curvature of the surface 10a.

The anamorphic lens 10 further has a surface 10b directed to the surface 3. The surface 10b is finished to a cylindrical surface which curves only in the direction y.

Further, the anamorphic lens 10 is so finished that the signs of the radii $r_{x14}$ and $r_{y14}$ of curvature are different from each other. Here, it is noted that: The radius has a positive value when the center of its curvatures exists at the surface 3 side (or the right-hand side in FIGS. 6A and 6B); On the contrary, it has a negative value when its center exists at the mirror surfaces 1a side (or the left-hand side in FIGS. 6A and 6B). The reason for this is that it is necessary to design the anamorphic lens 10 so that its refractive power along the direction x is reduced from the optical axis OA toward both ends of the lens, in order to correct curvature of field.

Figure 7A:
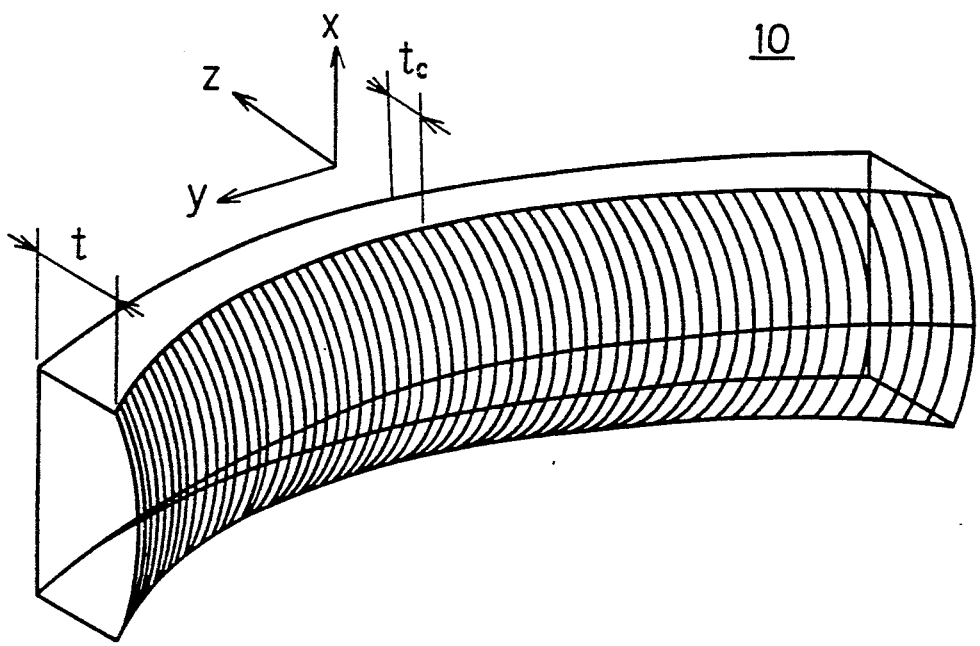
FIG. 7A is a perspective view of an anamorphic lens which is an element of the optical beam scanning system.
Figure 7B:
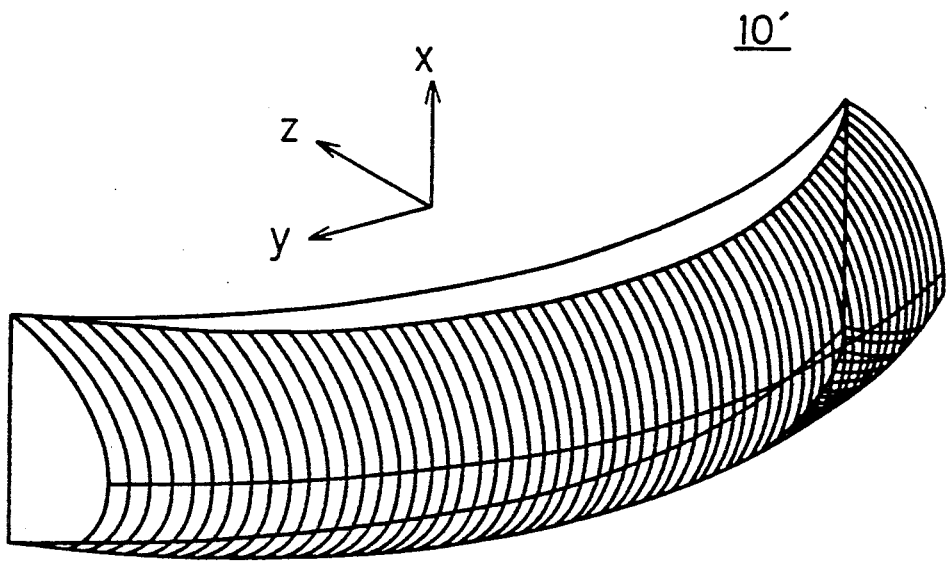
FIGS. 7B, 7C and to 7D are perspective views for explaining the lens shown in FIG. 7A.
Figure 7C:
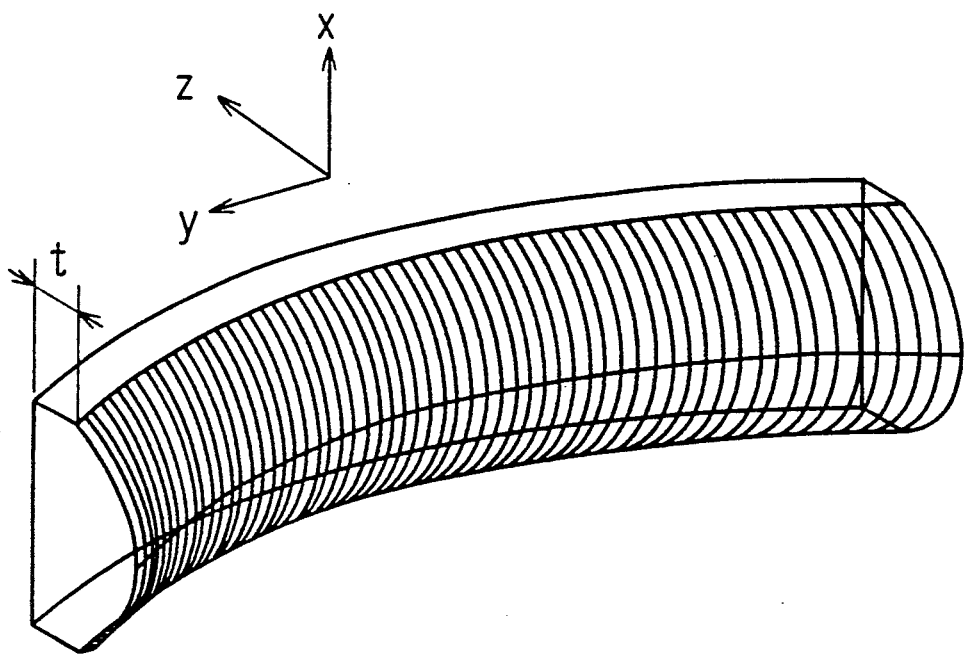
Figure 7D:
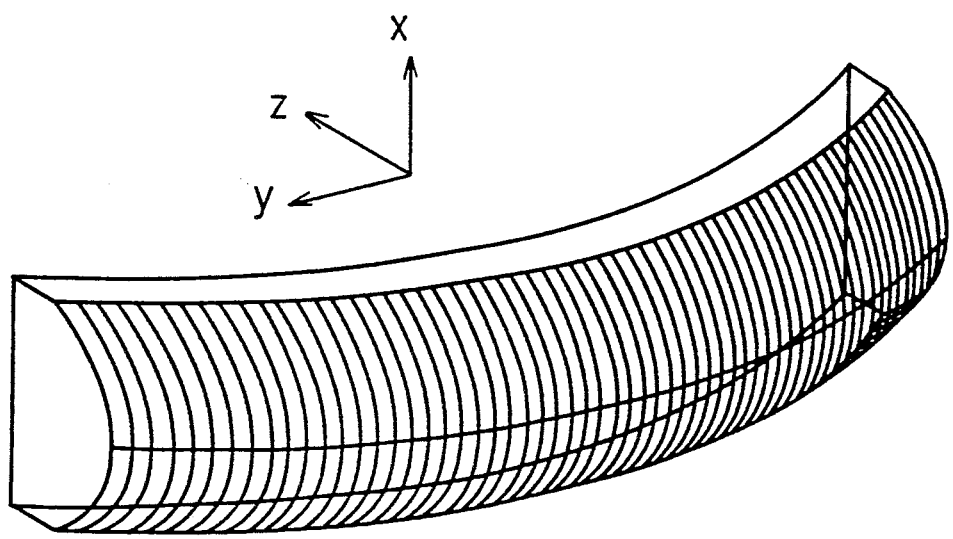

FIG. 7A is a perspective view of the anamorphic lens 10 of FIG. 5. FIG. 7B is a perspective view of an anamorphic lens 10' in which signs of radii $r_{x14}$ and $r_{y14}$ of curvature are identical to each other. For the purpose of reference, further, FIG. 7C is a perspective view of a cylindrical lens which has two surfaces having radii of curvature of different signs along directions x and y, and FIG. 7D is a perspective view of a cylindrical lens which has two surfaces having radii of curvature of the same signs along directions x and y. In the cylindrical lenses of FIGS. 7C and 7D, the surfaces thereof curve only in the direction y.

As in FIG. 7C, the radius of curvature of the cylindrical surface along the direction x is regularly constant at any position in the direction y in the cylindrical lens, and a thickness t at an edge portion of the lens is uniform along the direction y. On the other hand, the anamorphic lens 10 shown in FIG. 7A is so finished that an edge thickness $t_c$ at the central portion is the smallest and its thickness t is gradually increased toward both ends of the lens. In other words, the radius of curvature of the anamorphic lens 10 along the direction x is increased from the optical axis OA toward both ends of the lens. Hence, refractive power along the direction x is gradually reduced from the optical axis OA toward the ends of the lens.

Considering FIGS. 7B and 7D similarly to the above, in the anamorphic lens 10', the radius of curvature of one surface along the direction x is reduced from the optical axis OA toward both ends of the lens. Thus, refractive power along the direction x is increased from the optical axis OA toward both ends of the lens in the anamorphic lens 10' of FIG. 7B.

Consequently, in order to correct curvature of field, the anamorphic lens 10 must be in the state of FIG. 7A. More particularly, the signs of the radii of curvature along the directions x and y must indispensably be different from each other, in addition to finishing of one surface in accordance with the expression (1) while finishing of the other surface as the cylindrical surface 10b.

The surfaces 10a and 10b of the anamorphic lens 10 are preferably constructed in a concentric configuration, so that an image surface in the scanning direction will not damage characteristics of the scanning lens.

Figure 8A:
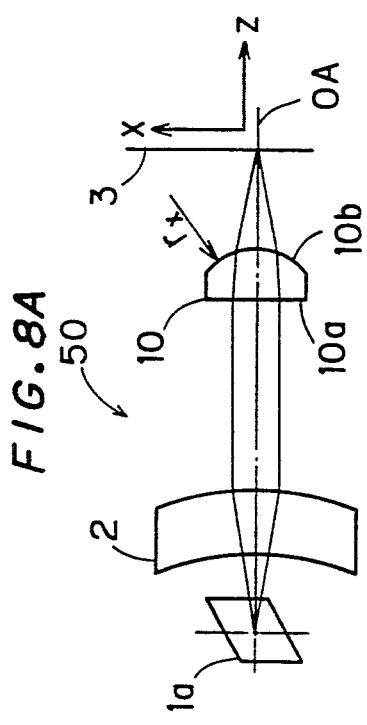
FIGS. 8A, 8B and 8C are a schematic view of an optical beam scanning system according to a second preferred embodiment of the present invention.
Figure 8B:
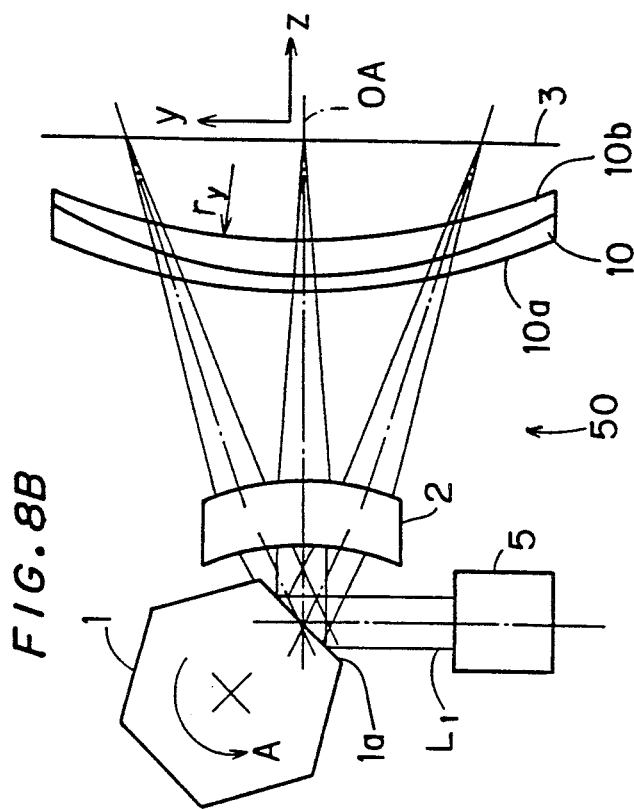
Figure 8C:
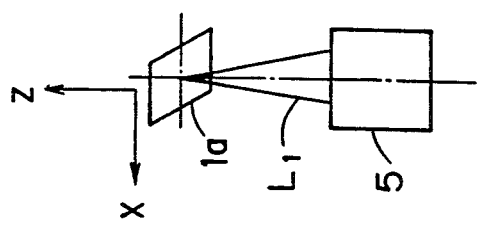

Although the surface 10a directed to the scanning lens 2 is finished in accordance with the expression (1) while the surface 10b directed to the surface 3 is finished to a cylindrical surface in the anamorphic lens 10, the same may be inversely finished, as shown in FIG. 8. Namely, the surface 10a directed to the scanning lens 2 may be finished to a cylindrical surface and the surface 10b directed to the surface 3 may be finished in accordance with the expression (1), in order to correct curvature of field in a similar manner to the above.

In the optical beam scanning system, as shown in FIGS. 5 and 8, the mirror surfaces 1a of the rotary polygon mirror 1 and the surface 3 are optically conjugate with respect to the direction parallel to the axis of rotation of the rotary polygon mirror 1. Thus, the facet error is corrected.

Although the first image-forming optical system 5 is in a two-group-and-three-lens structure and the scanning lens 2 is in a three-group-and-four-lens structure in the above embodiments, the same are not restricted to these structures.

A. FIRST EXAMPLE

The following table 1 shows values of parameters concerning a first example according to the optical beam scanning system of FIG. 5:

TABLE 1

| First Image-Forming Optical System | | | |
|---|---|---|---|
| | | $d_0 = 6.867$ | |
| $rx_1 = 19.467$ | $ry_1 = \infty$ | $d_1 = 2.56$ | $n_1 = 1.49282$ |
| $rx_2 = -4.942$ | $ry_2 = \infty$ | $d_2 = 83.326$ | |
| Conic Coefficient: $k = -0.868$ | | | |
| $rx_3 = 316.949$ | $ry_3 = 316.949$ | $d_3 = 1.5$ | $n_2 = 1.60909$ |
| $rx_4 = 27.723$ | $ry_4 = 27.723$ | $d_4 = 4.0$ | $n_3 = 1.58251$ |
| $rx_5 = -60.664$ | $ry_5 = -60.664$ | $d_5 = 94.655$ | |
| Plane of Deflection (Mirror Surface) | | | |
| $rx_6 = \infty$ | $ry_6 = \infty$ | $d_6 = 50$ | |
| Scanning Lens | | | |
| $rx_7 = -70.851$ | $ry_7 = -70.851$ | $d_7 = 16.074$ | $n_4 = 1.82496$ |
| $rx_8 = -62.561$ | $ry_8 = -62.561$ | $d_8 = 7.668$ | |
| $rx_9 = -63.596$ | $ry_9 = -63.596$ | $d_9 = 5.0$ | $n_5 = 1.82496$ |
| $rX_{10} = 978.014$ | $ry_{10} = 978.014$ | $d_{10} = 15.782$ | $n_6 = 1.66964$ |
| $rx_{11} = -107.673$ | $ry_{11} = -107.673$ | $d_{11} = 0.5$ | |
| $rx_{12} = -1245.193$ | $ry_{12} = -1245.193$ | $d_{12} = 13.019$ | $n_7 = 1.82496$ |
| $rx_{13} = -146.872$ | $ry_{13} = -146.872$ | $d_{13} = 381.597$ | |

TABLE 1-continued

Anamorphic Lens

| | | | |
|---|---|---|---|
| $rx_{14}=47.504$ | $ry_{14}=-1260.884$ | $d_{14}=5.0$ | $n_8=1.48577$ |
| $rx_{15}=\infty$ | $ry_{15}=-1265.884$ | $d_{15}=115.409$ | |

Referring to Table 1, a symbol $d_0$ denotes the distance between the light source LS and the first lens surface 51a, and a symbol $d_i$ ($i=1,\ldots,14$) denotes the surface-to-surface distance between an i-th lens surface (or mirror surface) and an (i+1)-th lens surface from the light source LS on the optical axis OA, and a symbol $d_{15}$ denotes the distance between a fifteenth lens surface 10b and the surface 3. Further, symbols $n_1$ to $n_8$ denote refractive indices of the first to seventh lenses 51, 52, 53, 24, 25, 26 and 27 and the anamorphic lens 10 with respect to a wavelength of 780 nm, respectively. In the following second to fourth examples, similar symbols are used and description thereof is omitted.

A second lens surface from the light source LS, i.e., the surface 51b of the first lens 51 is an aspheric surface, and finished according to the following expression:

$$Z_0 = \frac{c_{x0} \cdot X_0^2}{1 + \sqrt{1 - (1+k)c_{x0}^2 \cdot X_0^2}} \quad (2)$$

where
symbols $X_0$ and $Z_0$ represent distances from an original point along the directions x and z, the original point being of the intersection at which the surface 51b of the first lens 51 and the optical axis 0A cross each other, and $c_{x0}\ldots$ inverse number of a radius $r_{xz}$ of curvature of the surface 51b in a direction x, $k\ldots$ conic coefficient ("$-0.868$").

In the optical beam scanning system of the first example, further, the numerical aperture in the light source side is "0.1" in both of the scanning direction y and the direction x, the numerical aperture in the surface side is "0.024" in both of the scanning direction y and the direction x, the scanning width is "350", and the scanning angle of view ($=2\theta$) is "50°."

Figure 9A:
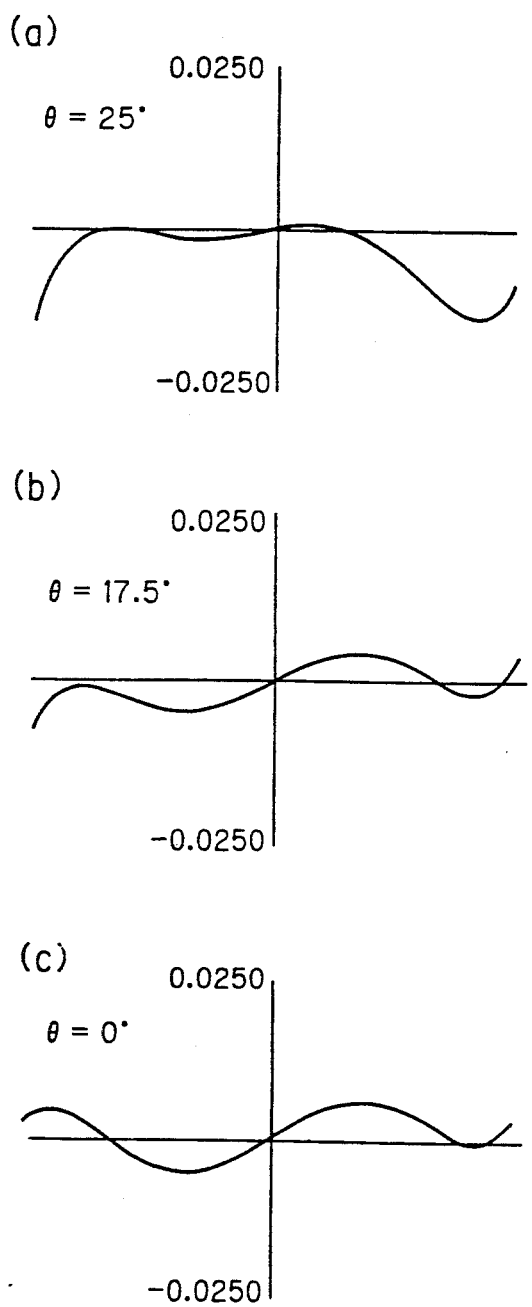
FIGS. 9A and 9B show lateral aberrations in a scanning direction y and a direction x in a first example.
Figure 9B:
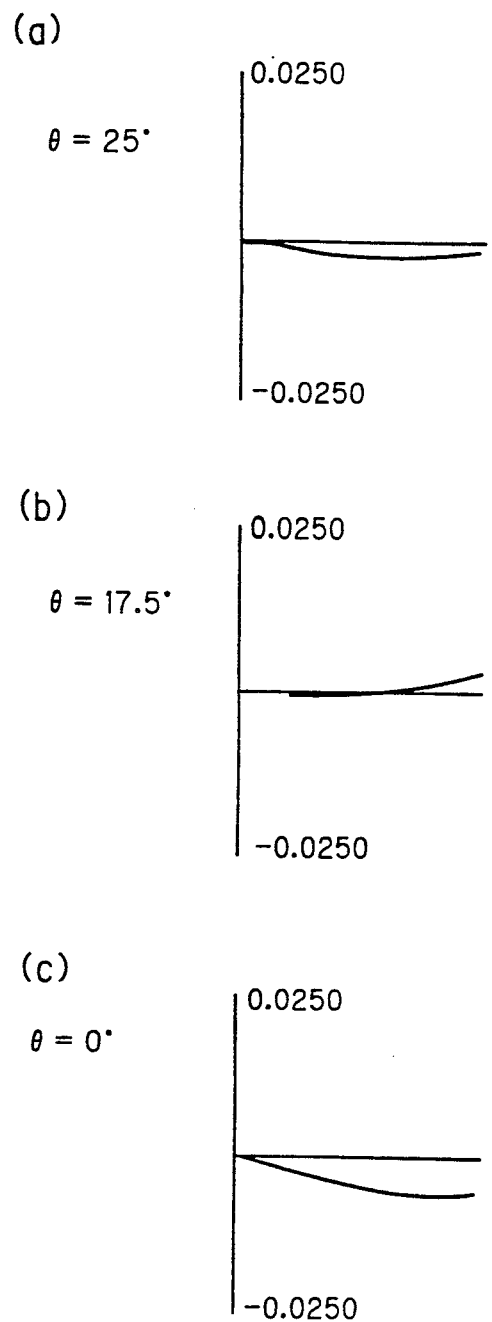
Figure 10:
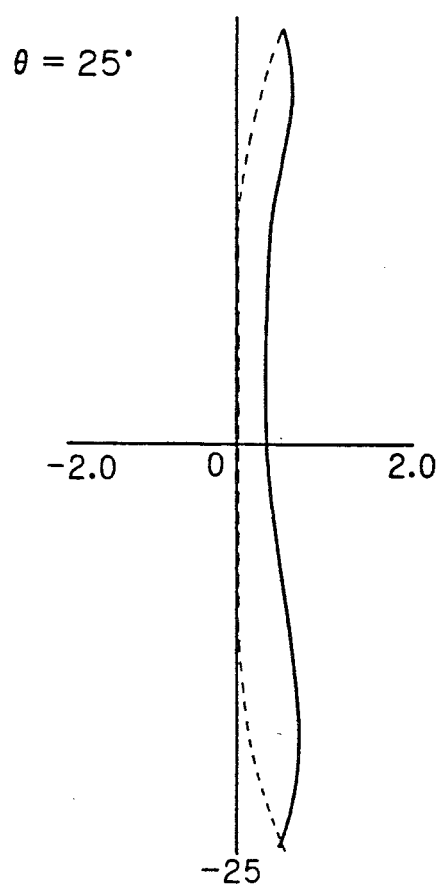
FIG. 10 shows astigmatism in the first example.
Figure 11:
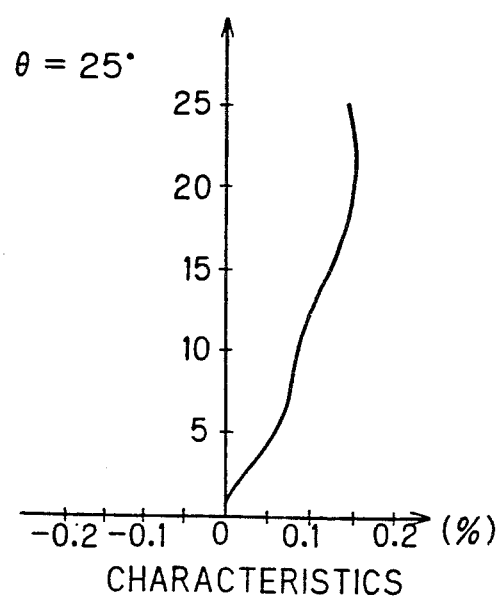
FIG. 11 illustrates the $f\theta$ characteristic in the first example.

FIGS. 9A and 9B show the lateral aberrations in the scanning direction y and the direction x in the first example, respectively. FIG. 10 shows the astigmatism therein. In FIG. 10 and in FIGS. 13, 16 and 19, which show astigmatism in the second, third and fourth examples, respectively, solid lines show an image field in the direction x while broken lines show an image field in the scanning direction y. FIG. 11 illustrates f$\theta$ characteristic in the first example. The f$\theta$ characteristic shown in each of FIG. 11 and FIGS. 14, 17 and 19 which show the f$\theta$ characteristic for the second, third and fourth examples, respectively, is a value defined by the following expression:

$$f\theta \text{ characteristic} = \frac{(\text{image height}) - f\theta}{f\theta} \quad (3)$$

B. SECOND EXAMPLE

An optical beam scanning system according to a second example is formed as shown in FIG. 8. The following table 2 shows values of parameters concerning the second example:

TABLE 2

First Image-Forming Optical System

| | | $d_0=6.867$ | |
|---|---|---|---|
| $rx_1=19.467$ | $ry_1=\infty$ | $d_1=2.56$ | $n_1=1.49282$ |
| $rx_2=-4.942$ | $ry_2=\infty$ | $d_2=83.326$ | |
| Conic Coefficient: $k=-0.868$ | | | |
| $rx_3=316.949$ | $ry_3=316.949$ | $d_3=1.5$ | $n_2=1.60909$ |
| $rx_4=27.723$ | $ry_4=27.723$ | $d_4=4.0$ | $n_3=1.58251$ |
| $rx_5=-60.664$ | $ry_5=-60.664$ | $d_5=94.655$ | |
| Plane of Deflection (Mirror Surface) | | | |
| $rx_6=\infty$ | $ry_6=\infty$ | $d_6=50$ | |
| Scanning Lens | | | |
| $rx_7=-70.851$ | $ry_7=-70.851$ | $d_7=16.074$ | $n_4=1.82496$ |
| $rx_8=-62.561$ | $ry_8=-62.561$ | $d_8=7.668$ | |
| $rx_9=-63.596$ | $ry_9=-63.596$ | $d_9=5.0$ | $n_5=1.82496$ |
| $rx_{10}=978.014$ | $ry_{10}=978.014$ | $d_{10}=15.782$ | $n_6=1.66964$ |
| $rx_{11}=-107.673$ | $ry_{11}=-107.673$ | $d_{11}=0.5$ | |
| $rx_{12}=-1245.193$ | $ry_{12}=-1245.193$ | $d_{12}=13.019$ | $n_7=1.82496$ |
| $rx_{13}=-146.872$ | $ry_{13}=-146.872$ | $d_{13}=377.959$ | |
| Anamorphic Lens | | | |
| $rx_{14}=\infty$ | $ry_{14}=2822.673$ | $d_{14}=5.0$ | $n_8=1.48577$ |
| $rx_{15}=-47.504$ | $ry_{15}=2817.673$ | $d_{15}=118.672$ | |

A second lens surface from a light source side is an aspheric surface with the conic coefficient $k$ ($=-0.868$) which is finished according to the expression (2).

The numerical aperture in the light source side, the numerical aperture in the surface side, the scanning width and the scanning angle are also identical to those of the first example.

Figure 12A:
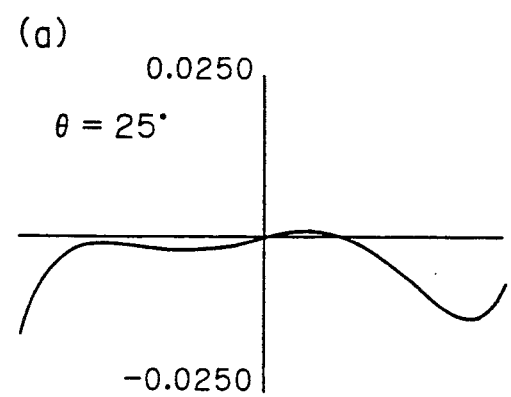
FIGS. 12A and 12B show lateral aberrations in the scanning direction y and the direction x in a second example.
Figure 12A:
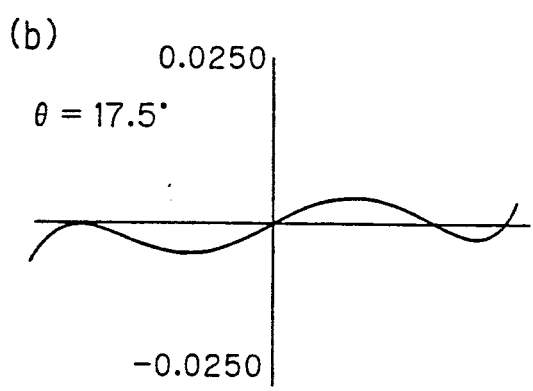
Figure 12A:
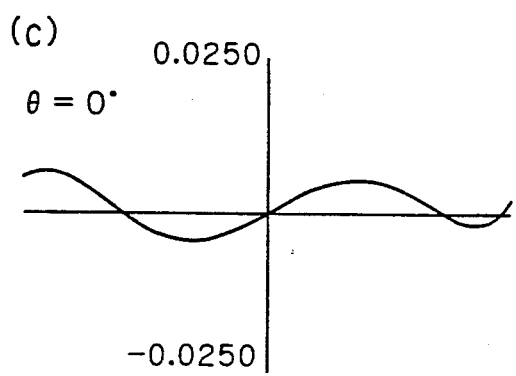
Figure 12B:
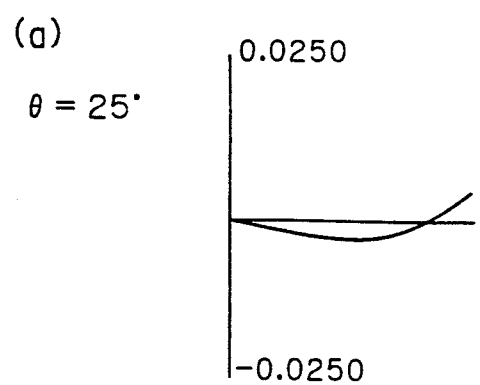
Figure 12B:
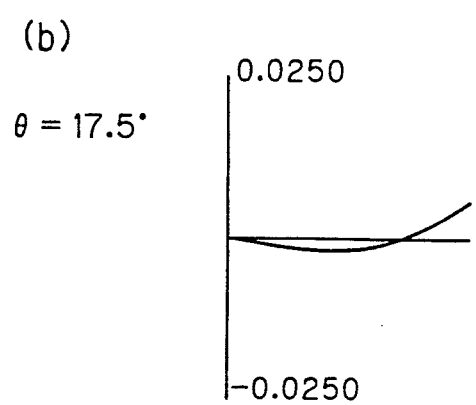
Figure 12B:
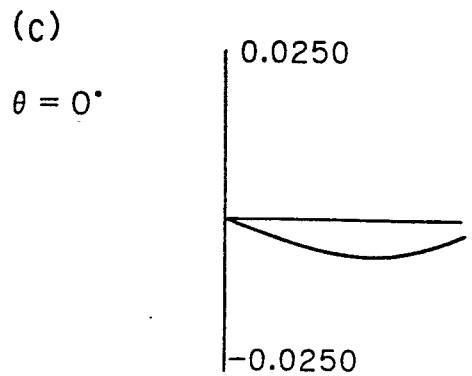
Figure 13:
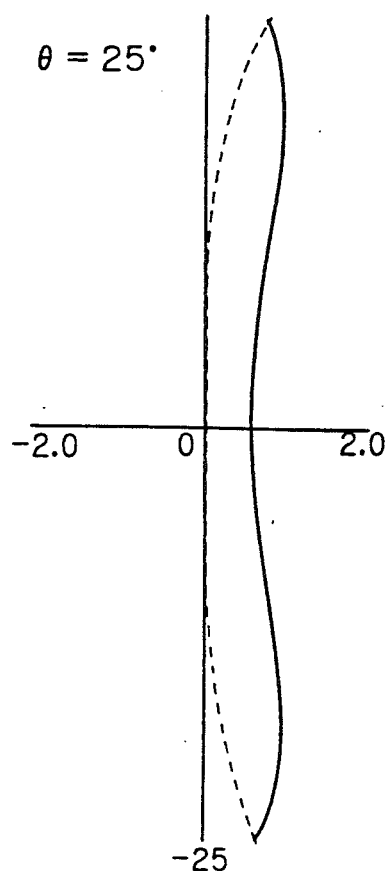
FIG. 13 shows astigmatism in the second example.
Figure 14:
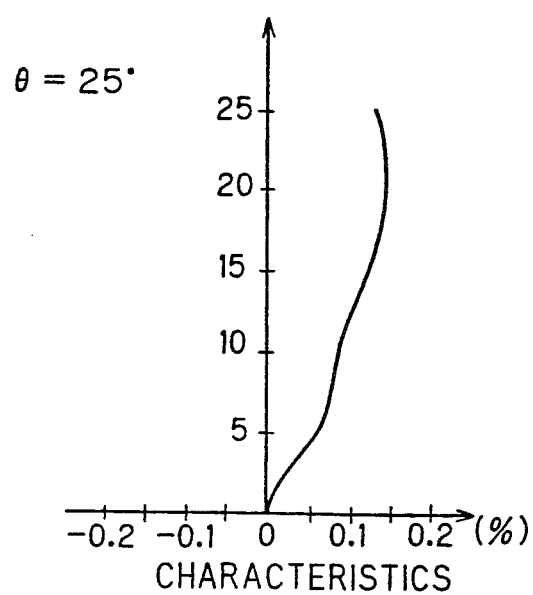
FIG. 14 illustrates the $f\theta$ characteristic in the second example.

FIGS. 12A and 12B show the lateral aberrations in the scanning direction y and the direction x in the second example, respectively, FIG. 13 shows the astigmatism, and FIG. 14 illustrates the f$\theta$ characteristic.

C. THIRD EXAMPLE

An optical beam scanning system according to a third example is formed as shown in FIG. 5. The following table 3 shows values of parameters concerning the third example:

TABLE 3

First Image-Forming Optical System

| | | $d_0=25.029$ | |
|---|---|---|---|
| $rx_1=51.938$ | $ry_1=\infty$ | $d_1=9.6$ | $n_1=1.49282$ |
| $rx_2=-19.345$ | $ry_2=\infty$ | $d_2=60.449$ | |
| Conic Coefficient: $k=-1.512$ | | | |
| $rx_3=316.949$ | $ry_3=316.949$ | $d_3=1.5$ | $n_2=1.60909$ |
| $rx_4=27.723$ | $ry_4=27.723$ | $d_4=4.0$ | $n_3=1.58251$ |
| $rx_5=-60.664$ | $ry_5=-60.664$ | $d_5=94.655$ | |
| Plane of Deflection (Mirror Surface) | | | |
| $rx_6=\infty$ | $ry_6=\infty$ | $d_6=50$ | |
| Scanning Lens | | | |
| $rx_7=-70.851$ | $ry_7=-70.851$ | $d_7=16.074$ | $n_4=1.82496$ |
| $rx_8=-62.561$ | $ry_8=-62.561$ | $d_8=7.668$ | |
| $rx_9=-63.596$ | $ry_9=-63.596$ | $d_9=5.0$ | $n_5=1.82496$ |
| $rx_{10}=978.014$ | $ry_{10}=978.014$ | $d_{10}=15.782$ | $n_6=1.66964$ |
| $rx_{11}=-107.673$ | $ry_{11}=-107.673$ | $d_{11}=0.5$ | |
| $rx_{12}=-1245.193$ | $ry_{12}=-1245.193$ | $d_{12}=13.019$ | $n_7=1.82496$ |
| $rx_{13}=-146.872$ | $ry_{13}=-146.872$ | $d_{13}=204.493$ | |
| Anamorphic Lens | | | |
| $rx_{14}=80.0$ | $ry_{14}=-656.048$ | $d_{14}=5.0$ | $n_8=1.48577$ |
| $rx_{15}=\infty$ | $ry_{15}=-661.048$ | $d_{15}=293.672$ | |

A second lens from a light source side is an aspheric lens. The aspheric lens has a surface with the conic coefficient $k$ ($=-1.512$) which is finished according to the expression (2).

The numerical aperture in the light source side, the numerical aperture in the surface side, the scanning width and the scanning angle are also identical to those of the first example.

Figure 15A:
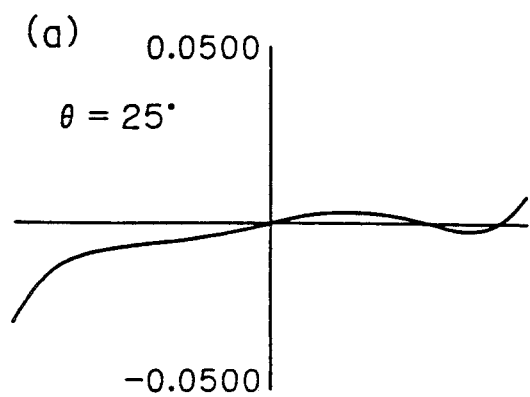
FIGS. 15A and 15B show lateral aberrations in the scanning direction y and the direction x in a third example.
Figure 15A:
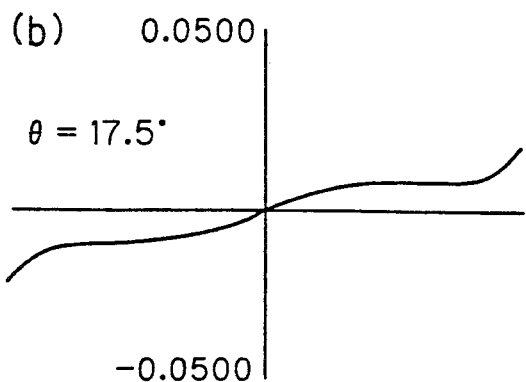
Figure 15A:
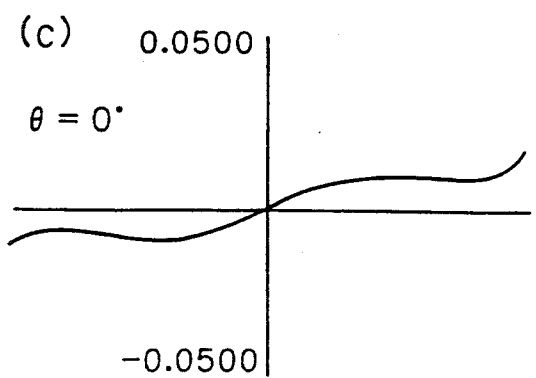
Figure 15B:
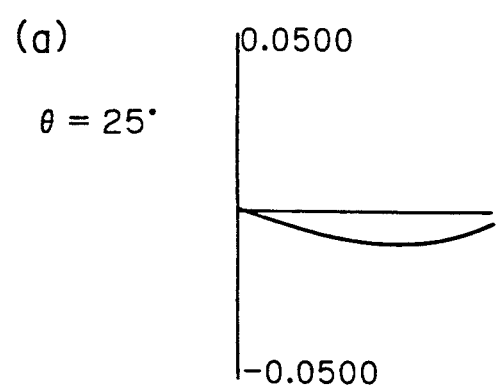
Figure 15B:
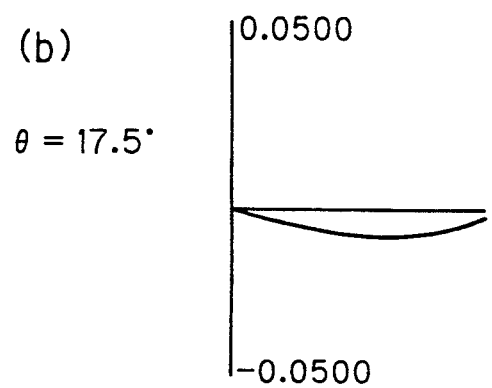
Figure 15B:
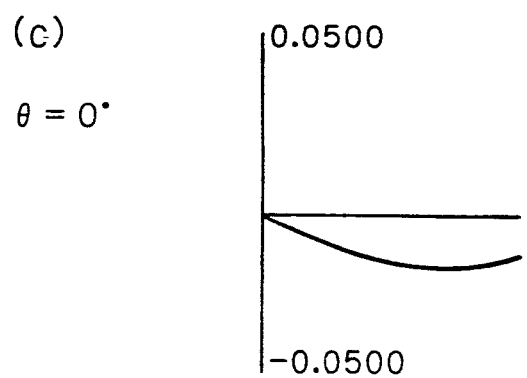
Figure 16:
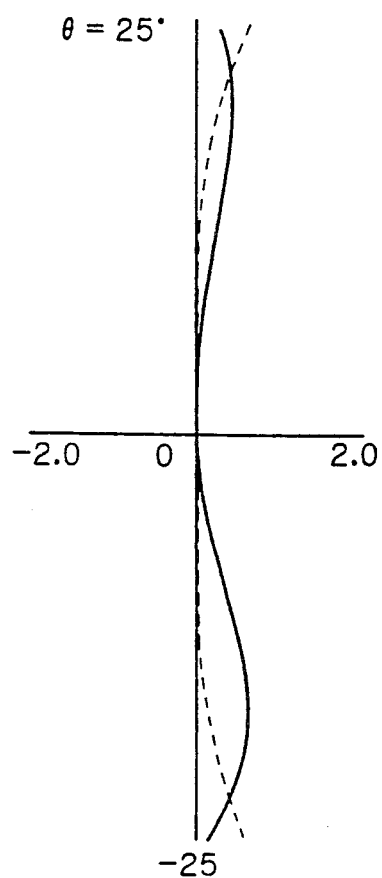
FIG. 16 shows astigmatism in the third example.
Figure 17:
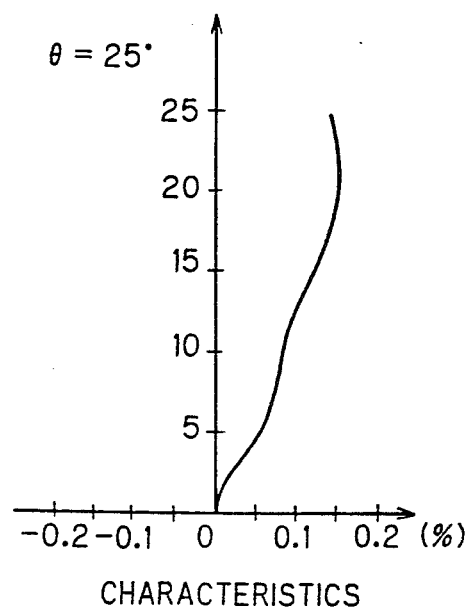
FIG. 17 illustrates the $f\theta$ characteristic in the third example.

FIGS. 15A and 15B show the lateral aberrations in the scanning direction y and the direction x in the third example, respectively, FIG. 16 shows the astigmatism, and FIG. 17 illustrates the fθ characteristic.

D. FOURTH EXAMPLE

An optical beam scanning system according to a fourth example is formed as shown in FIG. 8. The following table 4 shows values of parameters concerning the fourth example:

TABLE 4

First Image-Forming Optical System

| | | $d_0 = 22.579$ | |
|---|---|---|---|
| $rx_1 = 22.380$ | $ry_1 = \infty$ | $d_1 = 9.6$ | $n_1 = 1.49282$ |
| $rx_2 = -24.562$ | $ry_2 = \infty$ | $d_2 = 62.899$ | |

Conic Coefficient: $k = -7.506$

| $rx_3 = 316.949$ | $ry_3 = 316.949$ | $d_3 = 1.5$ | $n_2 = 1.60909$ |
|---|---|---|---|
| $rx_4 = 27.723$ | $ry_4 = 27.723$ | $d_4 = 4.0$ | $n_3 = 1.58251$ |
| $rx_5 = -60.664$ | $ry_5 = -60.664$ | $d_5 = 94.655$ | |

Plane of Deflection (Mirror Surface)

| $rx_6 = \infty$ | $ry_6 = \infty$ | $d_6 = 50$ | |
|---|---|---|---|

Scanning Lens

| $rx_7 = -70.851$ | $ry_7 = -70.851$ | $d_7 = 16.074$ | $n_4 = 1.82496$ |
|---|---|---|---|
| $rx_8 = -62.561$ | $ry_8 = -62.561$ | $d_8 = 7.668$ | |
| $rx_9 = -63.596$ | $ry_9 = -63.596$ | $d_9 = 5.0$ | $n_5 = 1.82496$ |
| $rx_{10} = 978.014$ | $ry_{10} = 978.014$ | $d_{10} = 15.782$ | $n_6 = 1.66964$ |
| $rx_{11} = -107.673$ | $ry_{11} = -107.673$ | $d_{11} = 0.5$ | |
| $rx_{12} = -1245.193$ | $ry_{12} = -1245.193$ | $d_{12} = 13.019$ | $n_7 = 1.82496$ |
| $rx_{13} = -146.872$ | $ry_{13} = -146.872$ | $d_{13} = 219.362$ | |

Anamorphic Lens

| $rx_{14} = \infty$ | $ry_{14} = 444.025$ | $d_{14} = 5.0$ | $n_8 = 1.48577$ |
|---|---|---|---|
| $rx_{15} = -80.0$ | $ry_{15} = 439.025$ | $d_{15} = 275.712$ | |

A second lens from a light source side is an aspheric lens. The aspheric lens has a surface with the conic coefficient $k\ (= -7.506)$ which is finished according to the expression (2).

The numerical aperture in the light source side, the numerical aperture in the surface side, the scanning width and the scanning angle are also identical to those of the first example.

Figure 18A:
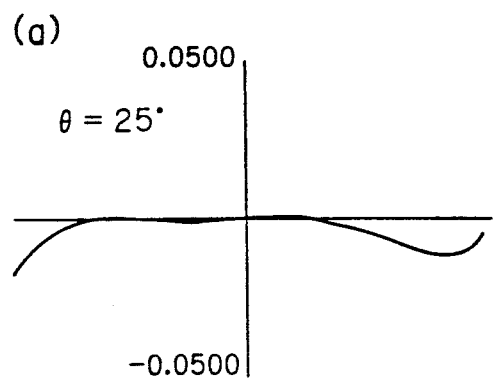
FIGS. 18A and 18B show lateral aberrations in the scanning direction y and the direction x in a fourth example.
Figure 18A:
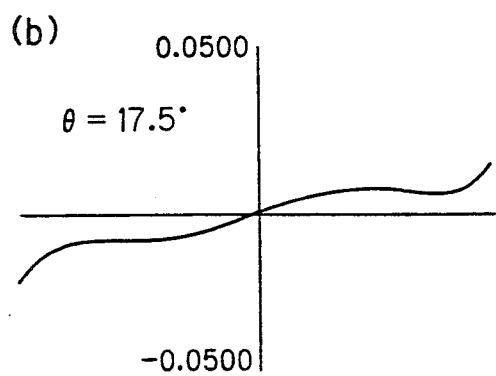
Figure 18A:
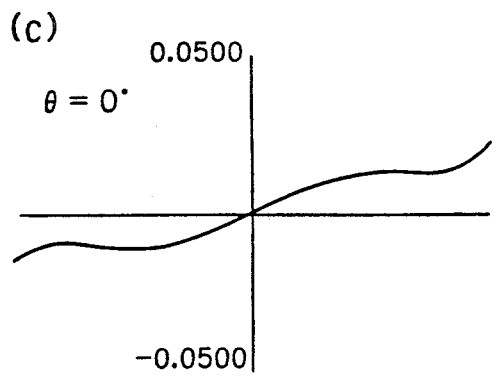
Figure 18B:
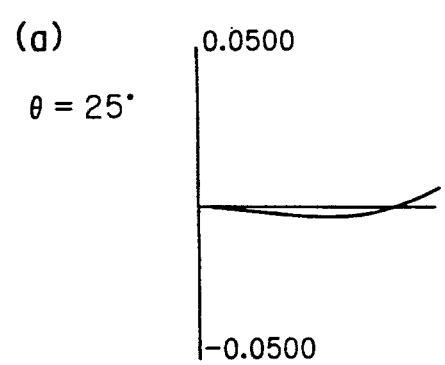
Figure 18B:
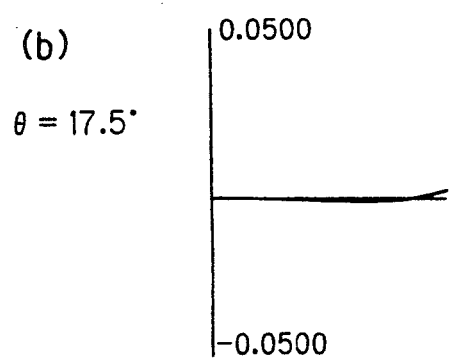
Figure 18B:
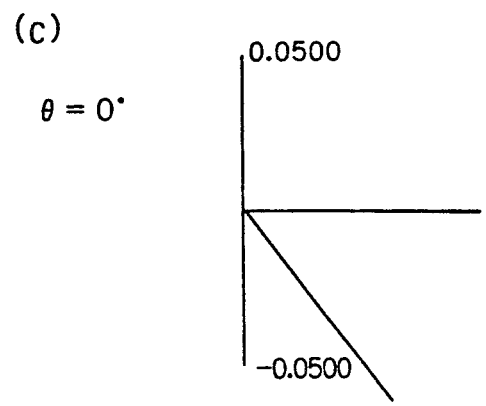
Figure 19:
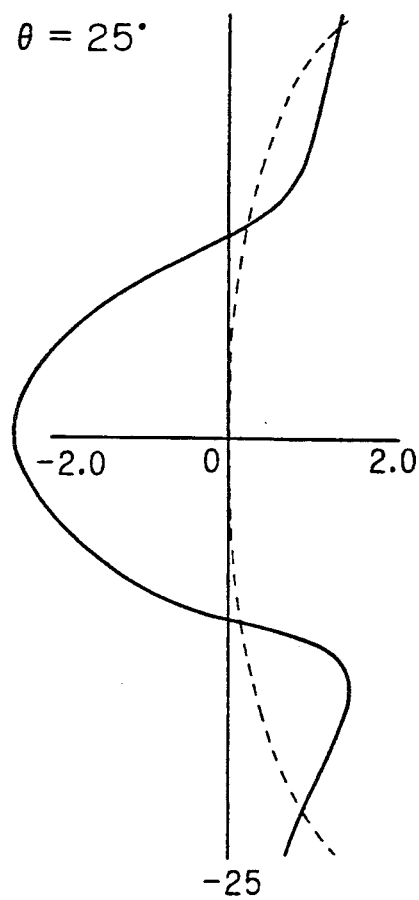
FIG. 19 shows astigmatism in the fourth example.
Figure 20:
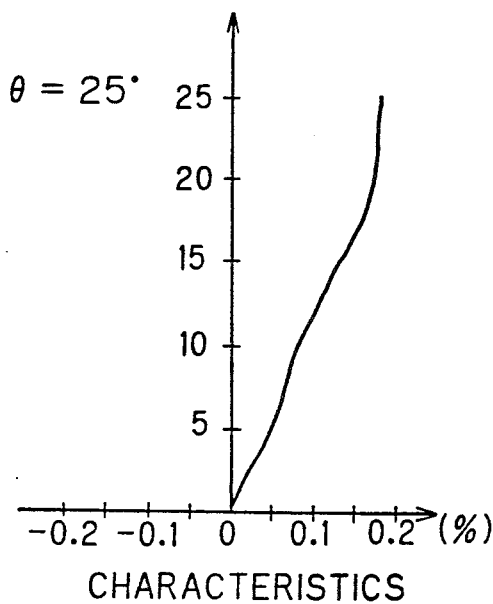
FIG. 20 illustrates the $f\theta$ characteristic in the fourth example.

FIGS. 18A and 18B show the lateral aberrations in the scanning direction y and the direction x of the third example, respectively, FIG. 19 shows the astigmatism, and FIG. 20 illustrates the fθ characteristic.

E. EFFECTS OF FIRST TO FOURTH EXAMPLES

It will be understood from FIGS. 10, 13, 16 and 19 that the curvature of field is small according to any example.

As will be understood from the value of each distance $d_{15}$ (= distance between the anamorphic lens 10 and the surface 3) shown in Tables 1 to 4, it is possible to suppress the curvature of field even if the anamorphic lens 10 is arranged in a position relatively separated from the surface 3. Thus, the anamorphic lens 10 can be miniaturized.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. An optical beam scanning system, comprising:
   a light source for emitting a light beam;
   a deflector for deflecting the light beam in a first direction;
   a first optical system for converging the light beam onto said deflector in a second direction, the second direction being perpendicular to the first direction; and
   a second optical system for focussing the light beam deflected by said deflector on a surface to be scanned, said second optical system comprising a scanning lens and an anamorphic lens, said scanning lens being located between said anamorphic lens and said deflector, said anamorphic lens having a first surface which is finished according to the following expression:

$$Z = \frac{c_x \cdot X^2 + c_y \cdot Y^2}{1 + \sqrt{1 - c_x^2 \cdot X^2 - c_y^2 \cdot Y^2}}$$

where symbols X, Y and Z represent distances from an original point along the first, the second and a third directions, respectively, the third direction being perpendicular to both the first and the second directions, the original point being of the intersection at which said first surface and an optical axis of said second optical system cross each other, and symbols $c_y$ and $c_x$ represent inverse numbers of radii of curvature of said first surface on the optical axis in the first and the second directions, respectively.

2. An optical beam scanning system of claim 1, wherein signs of the radii of curvature of said first surface in the first and the second direction are different from each other.

3. An optical beam scanning system of claim 1, wherein said anamorphic lens further has a second surface which is finished to a cylindrical surface.

4. An optical beam scanning system of claim 3, wherein said first and said second surfaces of said anamorphic lens are constructed in a concentric configuration.

5. An optical beam scanning system of claim 3, wherein said second surface is curved in the first direction.

6. An optical beam scanning system of claim 1, wherein said first surface is directed to said surface to be scanned.

7. An optical beam scanning system of claim 1, wherein said first surface is directed to said deflector.

* * * * *